US008988725B2

(12) United States Patent
Araya

(10) Patent No.: US 8,988,725 B2
(45) Date of Patent: Mar. 24, 2015

(54) IMAGE PROCESSING APPARATUS THAT ACQUIRES IMAGE DATA FROM REMOVABLE DRIVER AND IMAGE PROCESSING METHOD

(71) Applicant: KYOCERA Document Solutions Inc., Tamatsukuri, Chuo-ku, Osaka-shi, Osaka (JP)

(72) Inventor: Takeshi Araya, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/138,404

(22) Filed: Dec. 23, 2013

(65) Prior Publication Data

US 2014/0185098 A1    Jul. 3, 2014

(30) Foreign Application Priority Data

Dec. 27, 2012   (JP) ................................. 2012-285562

(51) Int. Cl.
*G06K 15/00*       (2006.01)
*H04N 1/00*        (2006.01)
*H04N 1/23*        (2006.01)

(52) U.S. Cl.
CPC ........... *H04N 1/00347* (2013.01); *H04N 1/233* (2013.01); *H04N 1/2369* (2013.01); *H04N 2201/0087* (2013.01); *H04N 2201/0082* (2013.01)
USPC ...................................... 358/1.16; 358/1.17

(58) Field of Classification Search
CPC .................................................. G06K 15/183
USPC .............................................. 358/1.16–1.17
See application file for complete search history.

(56) References Cited

U.S. PATENT DOCUMENTS

| 5,136,688 | A  | * | 8/1992  | Morikawa et al. ........... 358/1.16 |
| 5,604,846 | A  | * | 2/1997  | Kadota ........................ 358/1.16 |
| 5,898,824 | A  | * | 4/1999  | Kato et al. .................... 358/1.16 |
| 6,552,819 | B2 | * | 4/2003  | Osawa et al. ................. 358/1.17 |
| 2002/0067492 | A1 | * | 6/2002 | Ueda .............................. 358/1.9 |
| 2006/0055975 | A1 |   | 3/2006 | Toda |
| 2007/0002065 | A1 | * | 1/2007 | Otake et al. ................... 345/581 |
| 2007/0146785 | A1 | * | 6/2007 | Akiyama et al. ............ 358/1.16 |
| 2007/0292003 | A1 | * | 12/2007 | Hirabayashi .................. 382/120 |
| 2008/0074683 | A1 | * | 3/2008 | Yanamura et al. ............. 358/1.2 |
| 2009/0213406 | A1 | * | 8/2009 | Kimura ........................ 358/1.13 |
| 2010/0296126 | A1 | * | 11/2010 | Shiohara ...................... 358/1.15 |

FOREIGN PATENT DOCUMENTS

JP    2006-076215    3/2006

* cited by examiner

*Primary Examiner* — Benny Q Tieu
*Assistant Examiner* — Quyen V Ngo

(57) ABSTRACT

In an image processing apparatus, a data handling unit (a) estimates a size of the intermediate data on the basis of the image data, and (b) selects one of a first rendering mode and a second rendering mode on the basis of a size of the image data and the estimated size of the intermediate data. In the first rendering mode, the data handling unit makes a copy of the image data and stores the copy in the storage device and causes a rendering unit to generate bitmap image data from the image data stored in the storage device. In the second rendering mode, the data handling unit causes the rendering unit to generate the bitmap image data from the image data stored in the removable drive.

6 Claims, 7 Drawing Sheets

IMAGE PROCESSING APPARATUS THAT ACQUIRES IMAGE DATA FROM REMOVABLE DRIVER AND IMAGE PROCESSING METHOD

CROSS-REFERENCE TO RELATED APPLICATIONS

This application relates to and claims priority rights from Japanese Patent Application No. 2012-285562, filed on Dec. 27, 2012, the entire disclosures of which are hereby incorporated by reference herein.

BACKGROUND

1. Field of the Present Disclosure

The present disclosure relates to an image processing apparatus and an image processing method.

2. Description of the Related Art

In general, a printing device capable of connecting to a removable drive such as a USB (Universal Serial Bus) flash drive (a) reads image data such as a PDF (Portable Document Format) file from the removable drive, (b) analyzes the image data, generates temporal intermediate data that includes the analyzing result using a memory and/or a hard disk drive in the printing device, and performs a rendering process using a memory and/or a hard disk drive in the printing device, and (c) generates bitmap image data corresponding to the image data for printing.

A printing device has a first mode that image data is developed from print data in a removal drive and a second mode that image data is developed from print data in a memory area inside of the printing device. If a free area size of the removal drive is sufficient to store the developed image data, the first mode is selected; and otherwise the second mode is selected.

In the aforementioned printing device, if a free area size of the removal drive is sufficient to store the developed image data, the developed image is stored in the removal drive. On the other hand, in a device that performs a rendering process after generating temporal intermediate data inside of the device, storing places must be required for both the original image data and the intermediate data, and therefore, even if a free area size is sufficient to store the developed image data, for example, in the aforementioned printing device, the free area may be short and the process may stop.

SUMMARY

An image processing apparatus according to an aspect of the present disclosure includes an interface, a storage device, a rendering unit, and a data handling unit. The interface acquires image data from a removable drive. The rendering unit (a) generates intermediate data from the image data and store the intermediate data in the storage device, and (b) generates bitmap image data on the basis of the intermediate data. The data handling unit (a) estimates a size of the intermediate data on the basis of the image data, and (b) selects one of a first rendering mode and a second rendering mode on the basis of a size of the image data and the estimated size of the intermediate data. In the first rendering mode, the data handling unit is further configured to make a copy of the image data and store the copy in the storage device and to cause the rendering unit to generate the bitmap image data from the image data stored in the storage device. In the second rendering mode, the data handling unit is further configured to cause the rendering unit to generate the bitmap image data from the image data stored in the removable drive.

An image processing method according to an aspect of the present disclosure includes the steps of: acquiring image data from a removable drive; estimating a size of intermediate data on the basis of the image data; selecting one of a first rendering mode and a second rendering mode on the basis of a size of the image data and the estimated size of the intermediate data; and generating the intermediate data from the image data, storing the intermediate data in a storage device, and generating bitmap image data on the basis of the intermediate data in the selected one of the first rendering mode and the second rendering mode. The first rendering mode makes a copy of the image data and stores the copy in the storage device and generates the bitmap image data from the image data stored in the storage device. The second rendering mode generates the bitmap image data from the image data stored in the removable drive.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Embodiment 1

Figure 1:
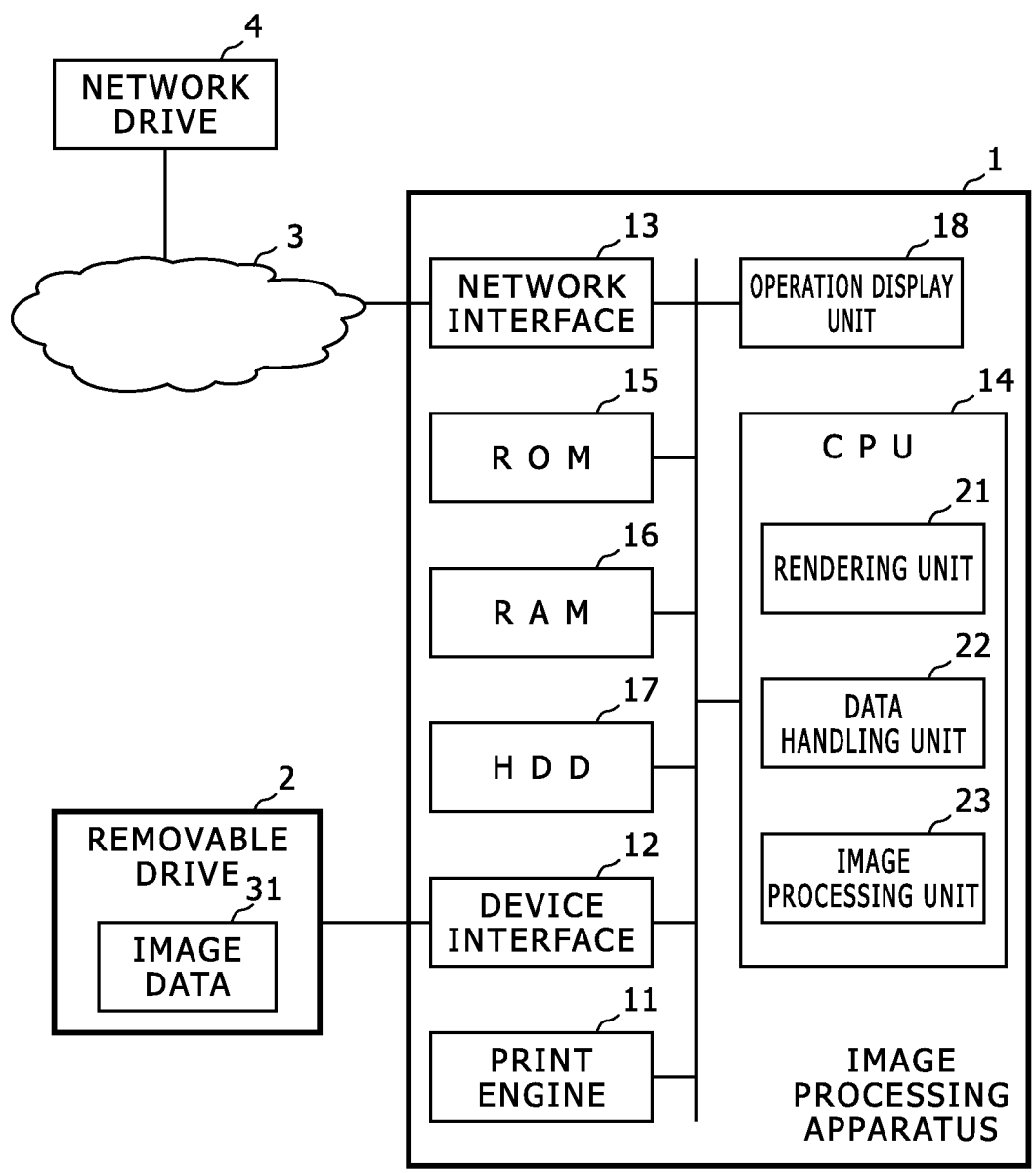
FIG. 1 shows a block diagram which indicates a configuration of an image processing apparatus according to an embodiment of the present disclosure.

FIG. 1 shows a block diagram which indicates a configuration of an image processing apparatus according to an embodiment of the present disclosure. The image processing apparatus 1 shown in FIG. 1 is an image forming apparatus such as a printer or a multi function peripheral, and includes a print engine 11 and a device interface 12. The print engine 11 performs printing an image on a paper sheet, and the device interface 12 is capable of connecting to a removable drive 2 such as a USB flash drive and performs read and write operations from and to the removable drive 2.

The device interface 12 is capable of acquiring image data 31 (here, a PDF file) stored in the removable drive 2.

Further, the network 3 is a LAN (Local Area Network) and/or a WAN (Wide Area Network), and a network drive 4 is connected to the network 3 and provides a storage service. The network drive 4 is a NAS (Network Attached Storage), a file server, a shared drive inside of a personal computer, or the like. The image processing apparatus 1 includes a network interface 13 that is connected to the network 3 and capable of data communication with the network drive 4 and so forth.

Further, the image processing apparatus 1 includes a hard disk drive (HDD) 17 as a large scale data storage device and a computer that includes a CPU (Central Processing Unit) 14, a ROM (Read Only Memory) 15 as a non volatile memory, a RAM (Random Access Memory) 16 as a volatile memory, and so forth.

The CPU 14 loads a program stored in the ROM 15, the HDD 17 and so forth to the RAM 16 and executes it to form sorts of processing units. The HDD 17 is a storage device built in the image processing apparatus 1 and is used as a temporal storage for image data, intermediate data, and so forth.

The CPU 14 forms a rendering unit 21, a data handling unit 22, and an image processing unit 23.

The rendering unit 21 generates intermediate data from the image data 31 and stores the intermediate data in the HDD 17, and generates bitmap image data on the basis of the intermediate data. The intermediate data includes an analyzing result of the image data.

The data handling unit 22 estimates a size of the intermediate data on the basis of the image data 31, and selects one of a first rendering mode and a second rendering mode on the basis of a size of the image data and the estimated size of the intermediate data.

In Embodiment 1, the data handling unit 22 selects the first rendering mode if a free area size of the HDD 17 is larger than a sum of the size of the image data 31 and the estimated size of the intermediate data. Otherwise, the data handling unit 22 selects the second rendering mode.

The first rendering mode is an operation mode in which a copy of the image data is made and stored in the HDD 17 and the rendering unit 21 is caused to generate the bitmap image data from the image data 31 stored in the HDD 17.

The second rendering mode is an operation mode in which the rendering unit 21 is caused to generate the bitmap image data from the image data 31 stored in the removable drive 2, without making a copy of the image data 31 and storing the copy in the HDD 17.

In the first rendering mode, although it takes a longer processing time due to making and storing a copy of the image data 31 than that in the second rendering mode, the removable drive 2 can be removed from the image processing apparatus 1 after making and storing a copy of the image data 31 to the HDD 17.

For example, the data handling unit 22 estimates a size of the intermediate data on the basis of a content (a setting value of image resolution, an image size, and so forth) of the image data 31 (here, a PDF file).

The image processing unit 23 generates print image data of each toner color of the print engine 11 by performing image processing such as color conversion, and a screening process for the bitmap image data generated by the rendering unit 21. The print engine 11 prints an image based on this print image data.

Further, the image processing unit 1 includes an operation display unit 18. The operation display unit 18 includes an input device that detects a user operation and a display device that display sort of information to a user.

In the following part, a behavior of the aforementioned image processing apparatus is explained.

Figure 2:
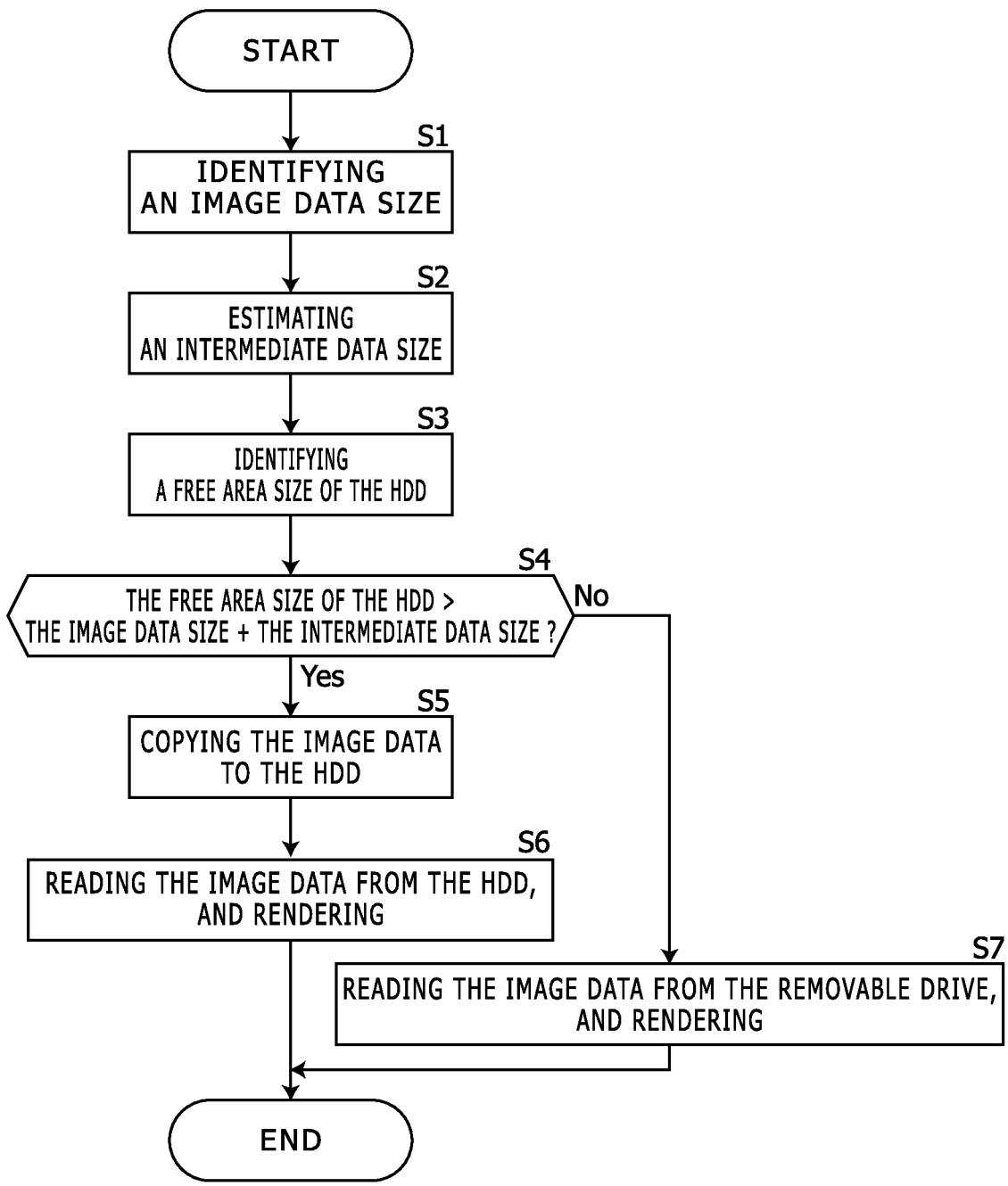
FIG. 2 shows a flowchart which explains a rendering process in Embodiment 1.

FIG. 2 shows a flowchart which explains a rendering process in Embodiment 1.

Firstly, the data handling unit 22 identifies a size of image data 31 stored in the removable drive 2 using the device interface 12 (Step S1).

Subsequently, the data handling unit 22 reads necessary data for size estimation of intermediate data from the removable drive 2 using the device interface 12, and estimates the size of the intermediate data on the basis of the read data (Step S2).

Further, the data handling unit 22 identifies a free area size of the HDD 17 (Step S3). It should be noted that this free area size is a size of a free area in a whole area that the rendering unit 21 can use.

Furthermore, the data handling unit 22 identifies whether the free area size of the HDD 17 is larger than a sum of a size of the image data 31 and the estimated size of the intermediate data (Step S4).

If the free area size of the HDD 17 is larger than a sum of a size of the image data 31 and the estimated size of the intermediate data, then the data handling unit 22 reads the image data 31 from the removable drive 2 using the device interface 12 and makes a copy of the image data 31 and stores the copy in the HDD 17 (Step S5). Otherwise, a copy of the image data 31 is not made and not stored in the HDD 17.

If a copy of the image data 31 is made and stored in the HDD 17, then the rendering unit 21 reads the image data 31 from the HDD 17, generates the intermediate data from the read image data 31, temporarily stores the intermediate data in the HDD 17, and generates bitmap image data from the intermediate data (Step S6).

Contrary to this, if a copy of the image data 31 is not made and not stored in the HDD 17, then the rendering unit 21 reads the image data 31 from the removable drive 2, generates the intermediate data from the read image data 31, temporarily stores the intermediate data in the HDD 17, and generates bitmap image data from the intermediate data (Step S7).

The image processing unit 23 processes the bitmap image data in turn using the RAM 16, and provides the print image data to the print engine 11. The print engine 11 performs printing on the basis of the print image data.

In the aforementioned Embodiment 1, the data handling unit 22 estimates a size of the intermediate data on the basis of the image data 31, and selects one of a first rendering mode and a second rendering mode on the basis of a size of the image data and the estimated size of the intermediate data.

Therefore, the possibility is lowered that not only a rendering process but printing stops due to shortage of a free area for the intermediate data.

Embodiment 2

In the image processing apparatus 1 of Embodiment 2, in Step S4 in FIG. 2, the data handling unit 22 selects the first rendering mode if a sum of the size of the image data 31 and the estimated size of the intermediate data is less than a predetermined threshold value. Otherwise, the data handling unit 22 selects the second rendering mode.

Other parts in the configuration and the operation of the image processing apparatus 1 in Embodiment 2 are identical to those in Embodiment 1, and therefore, they are not explained here.

Embodiment 3

In Embodiment 3, the data handling unit 22 deletes the image data stored in the HDD 17 and cause the rendering unit 21 to generate bitmap image data in the second rendering mode again if a storing area is short for the intermediate data in a case the first rendering mode is selected.

Other parts in the configuration of the image processing apparatus 1 in Embodiment 3 are identical to those in Embodiment 1, and therefore, they are not explained here. The image processing apparatus 1 in Embodiment 3 runs in the following manner.

Figure 3:
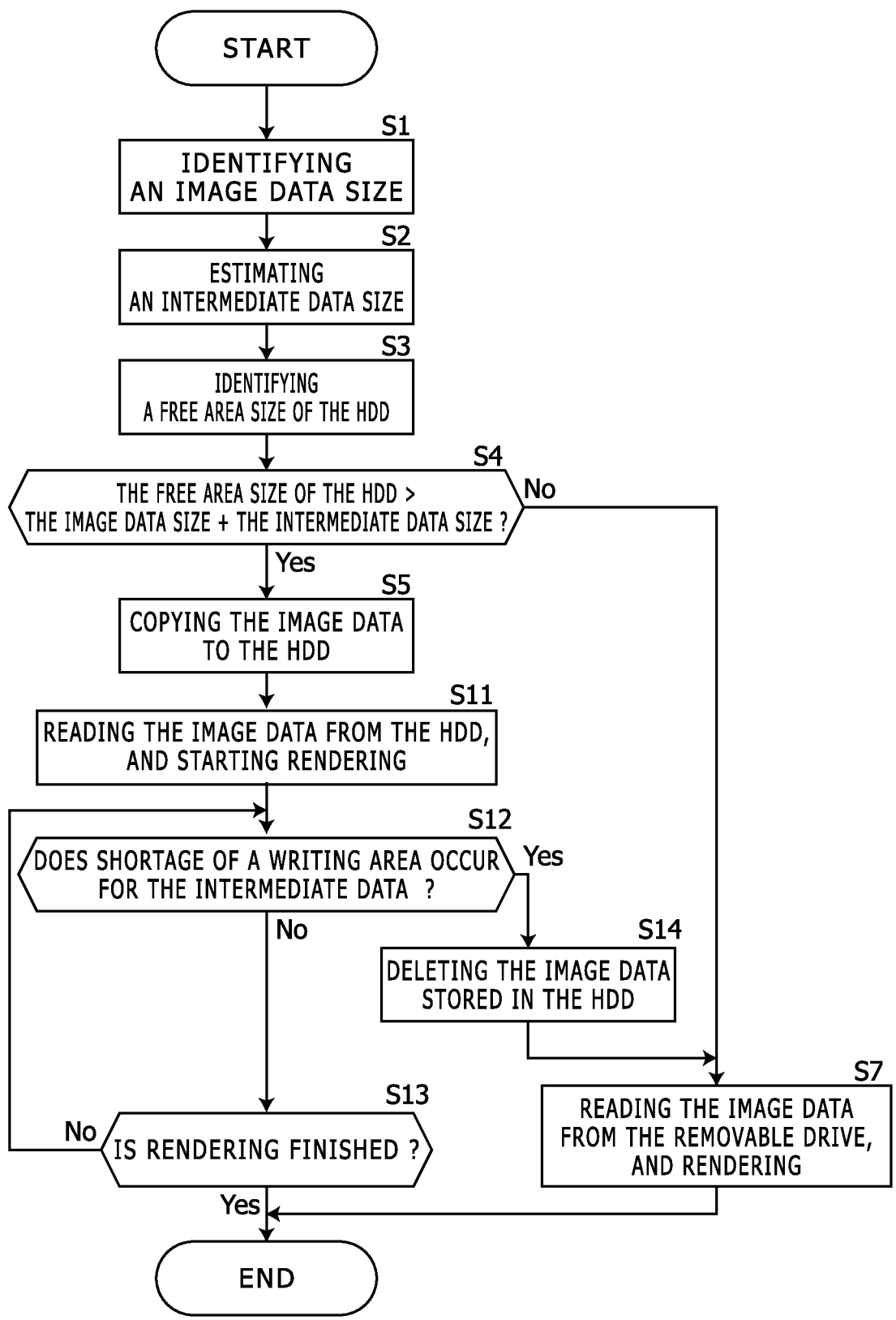
FIG. 3 shows a flowchart which explains a rendering process in Embodiment 3.

FIG. 3 shows a flowchart which explains a rendering process in Embodiment 3. Steps S1 to S5 and Step S7 in FIG. 3 are identical to those in Embodiment 1 (FIG. 2), and therefore they are not explained here.

In Embodiment 3, after selecting the first rendering mode, making a copy of the image data 31 and storing the copy in the HDD 17, the rendering unit 21 starts rendering of the image data 31 stored in the HDD 17 (Step S11).

The data handling unit 22 watches whether shortage of a writing area for the intermediate data generated by the rendering unit 21 occurs or not (Step S12). If shortage of a writing area for the intermediate data occurs until the rendering process is finished (Step S13), the data handling unit 22 deletes the image data 31 stored in the HDD 17 (Step S14), changes the operation mode to the second rendering mode, and causes the rendering unit 21 to perform the rendering process again (Step S7).

In the aforementioned Embodiment 3, even if a writing area for the intermediate data is short while rendering, the rendering process is performed in the second rendering mode, and consequently printing is not cancelled.

Embodiment 4

In Embodiment 4, the data handling unit 22 changes a storing place of the intermediate data from the HDD 17 to the removable drive 2 if a storing area is short for the intermediate data in a case the first rendering mode is selected.

Other parts in the configuration of the image processing apparatus 1 in Embodiment 4 are identical to those in Embodiment 1, and therefore, they are not explained here. The image processing apparatus 1 in Embodiment 4 runs in the following manner.

Figure 4:
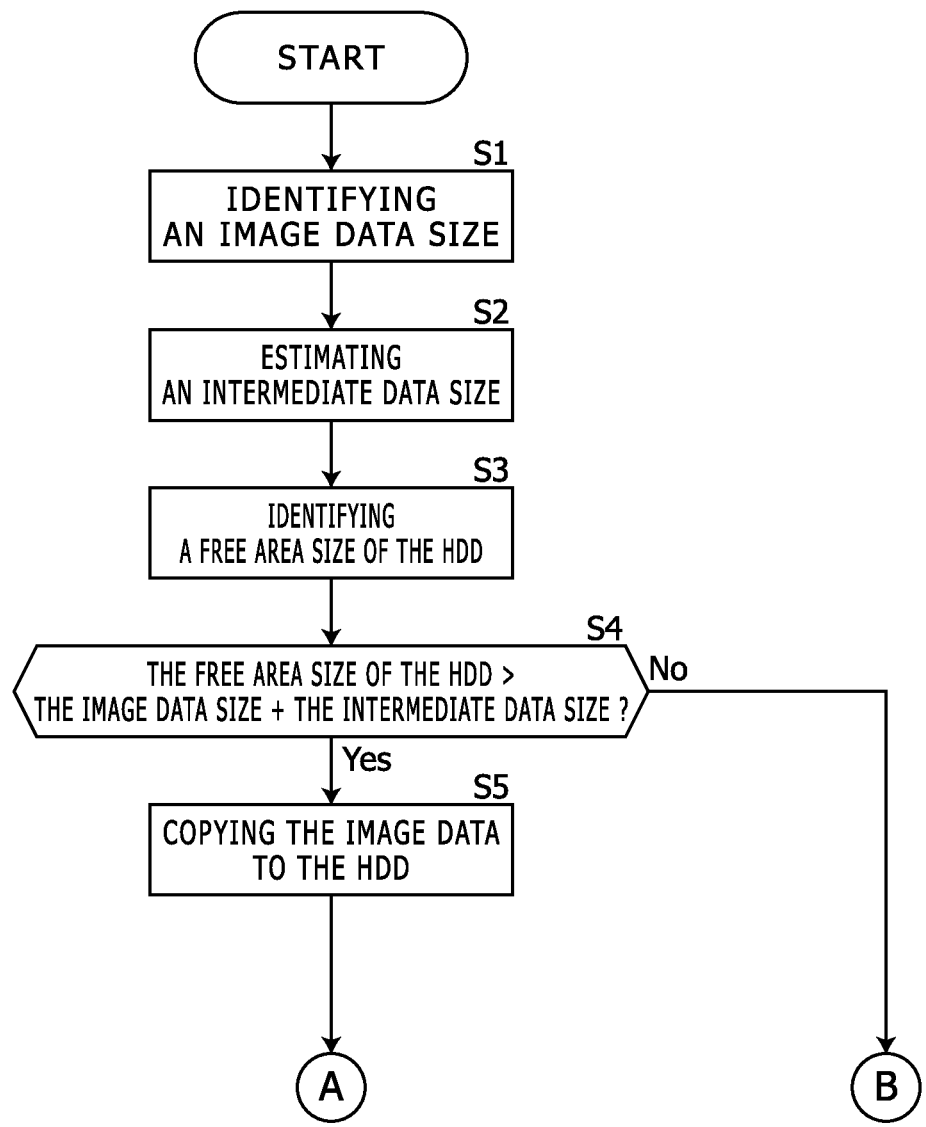
FIG. 4 shows a flowchart which explains a rendering process in Embodiment 4 (1/2)
Figure 5:
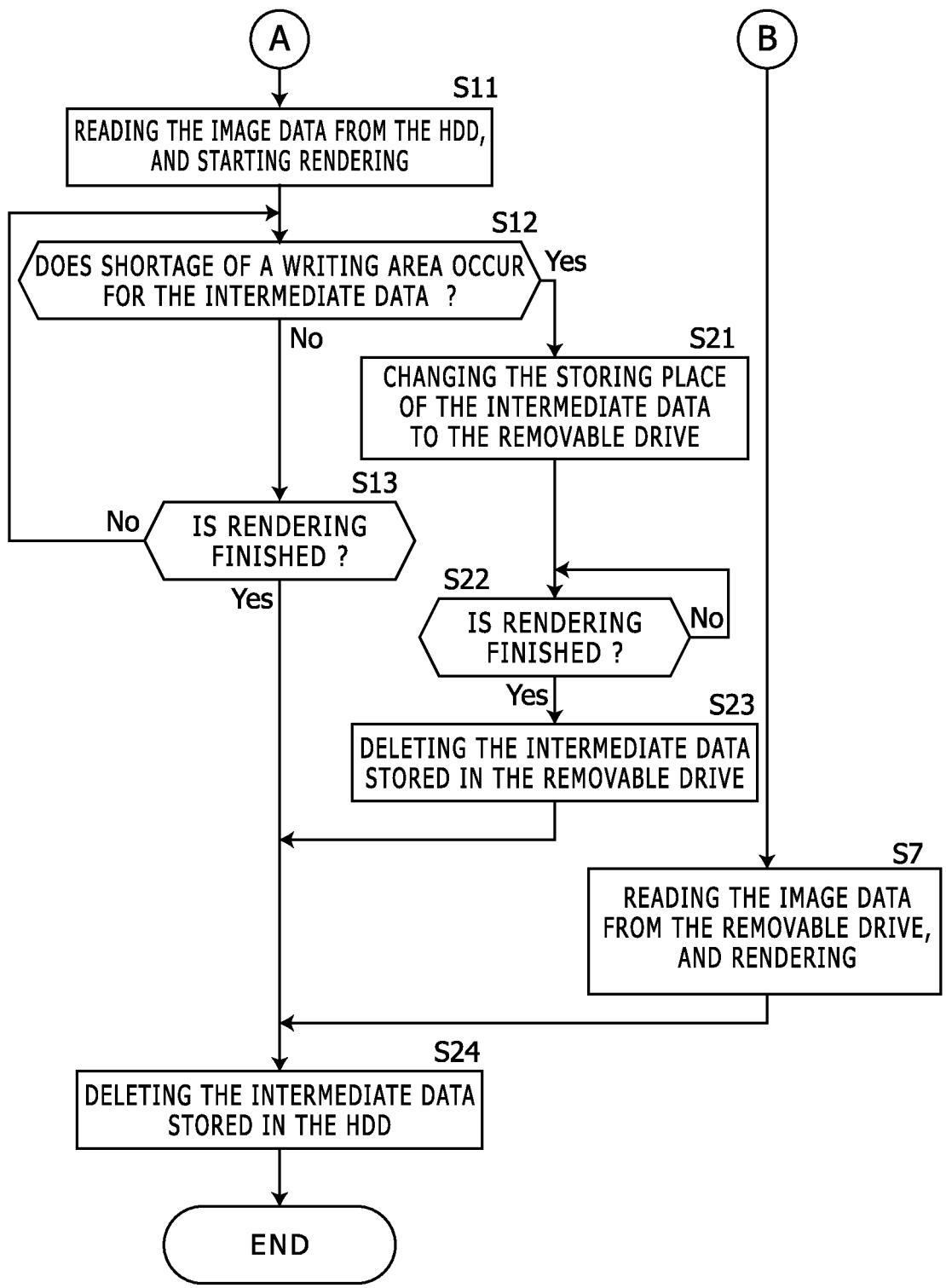
FIG. 5 shows a flowchart which explains a rendering process in Embodiment 4 (2/2)

FIG. 4 and FIG. 5 show a flowchart which explains a rendering process in Embodiment 4. Steps S1 to S5 and Step S7 in FIG. 4 and FIG. 5 are identical to those in Embodiment 1 (FIG. 2), and therefore they are not explained here.

In Embodiment 4, after selecting the first rendering mode, making a copy of the image data 31, and storing the copy in the HDD 17, the rendering unit 21 starts rendering of the image data 31 stored in the HDD 17 (Step S11).

If shortage of a writing area for the intermediate data occurs (Step S12) until the rendering process is finished (Step S13), the data handling unit 22 changes a storing place of the intermediate data to the removable drive 2 (Step S21). Subsequently, the rendering unit 21 continues the rendering process while storing the subsequent intermediate data in the removable drive 2 after changing the storing place.

After finishing the rendering process (Step S22), the data handling unit 22 deletes the intermediate data stored in the removable drive 2 (Step S23), and deletes the intermediate data stored in the HDD 17 (Step S24).

In the aforementioned Embodiment 4, even if a writing area for the intermediate data is short while rendering, the removable drive 2 is used as the writing area for the intermediate data in addition to the HDD 17, and consequently printing is not cancelled.

Embodiment 5

In Embodiment 5, in the first rendering mode, the data handling unit (a) identifies a free area size of the HDD 17 and also identifies a free area size of a network drive 4, and (b) sets one of the HDD 17 and the network drive 4, which has a larger free area, as a storing place for one of the image data 31 and the intermediate data, which has the larger one of the size of the image data 31 and the estimated size of the intermediate data, and sets the other of the HDD 17 and the network drive 4, which has a smaller free area, as a storing place for the other of the image data 31 and the intermediate data, which has the smaller one of the size of the image data 31 and the estimated size of the intermediate data. The rendering unit 21 reads the image data 31 from one of the HDD 17 and the network drive 4, stores the intermediate data in the other, and performs rendering.

Other parts in the configuration of the image processing apparatus 1 in Embodiment 5 are identical to those in Embodiment 1, and therefore, they are not explained here. The image processing apparatus 1 in Embodiment 5 runs in the following manner.

Figure 6:
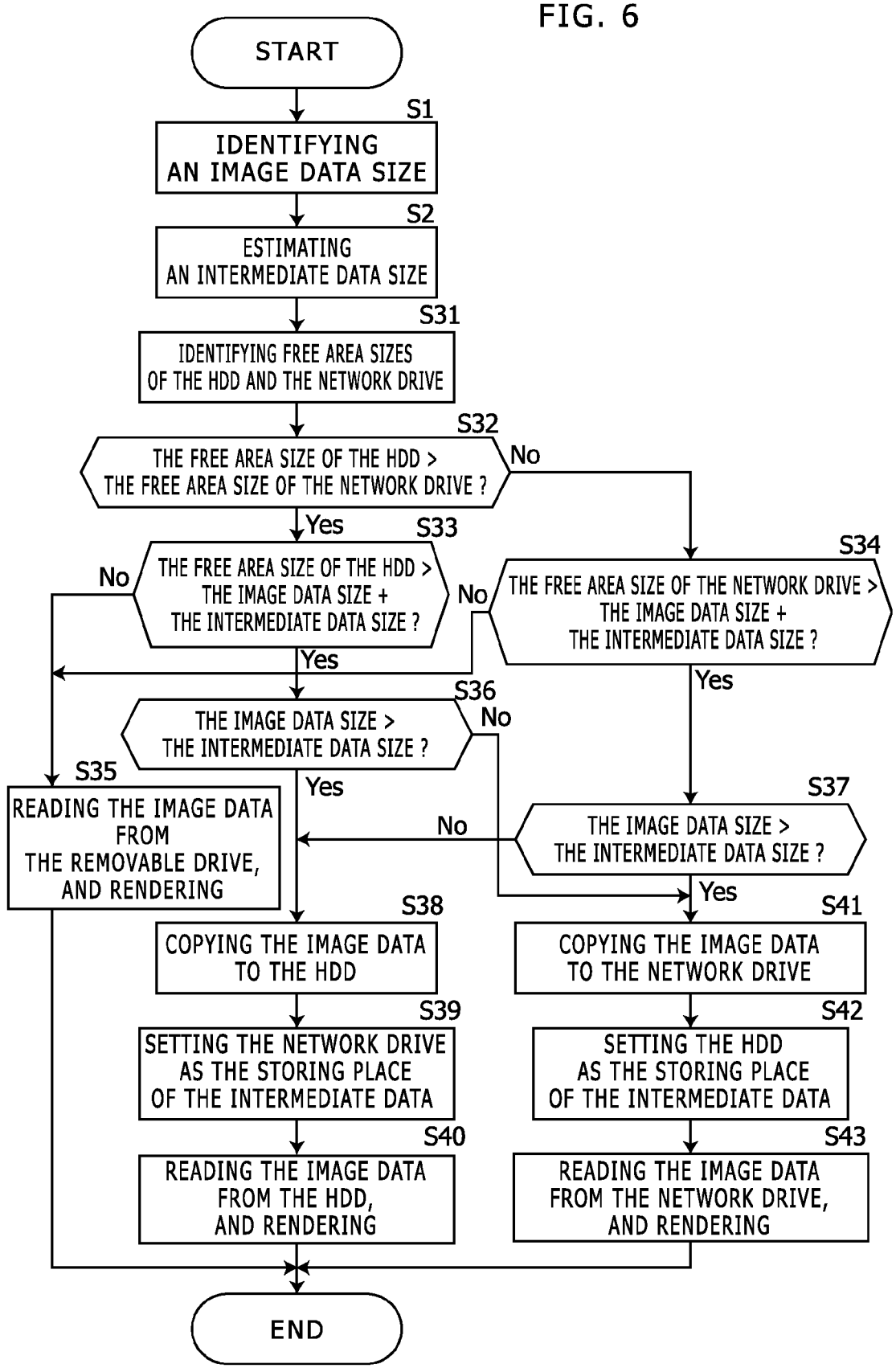
FIG. 6 shows a flowchart which explains a rendering process in Embodiment 5.

FIG. 6 shows a flowchart which explains a rendering process in Embodiment 5. Steps S1 and S2 in FIG. 6 are identical to those in Embodiment 1 (FIG. 2), and therefore they are not explained here.

In Embodiment 5, the data handling unit 22 identifies free area sizes of the HDD 17 and the network drive 4 (Step S31). Subsequently, the data handling unit 22 identifies whether or not the free area of the HDD 17 is larger than the free area of the network drive 4 (Step S32).

If the free area of the HDD 17 is larger than the free area of the network drive 4, then the data handling unit 22 identifies whether or not the free area size of the HDD 17 is larger than a sum of a size of the image data 31 and the estimated size of the intermediate data (Step S33). On the other hand, if the free area of the HDD 17 is not larger than the free area of the network drive 4, then the data handling unit 22 identifies whether or not the free area size of the network drive 4 is larger than a sum of a size of the image data 31 and the estimated size of the intermediate data (Step S34).

If the free area size of the HDD 17 is not larger than a sum of a size of the image data 31 and the estimated size of the intermediate data in Step S33 or the free area size of the network drive 4 is not larger than a sum of a size of the image data 31 and the estimated size of the intermediate data in Step S34, then the data handling unit 22 selects the second rendering mode, and causes the rendering unit 21 to perform a rendering process (Step S35).

If the free area size of the HDD 17 is larger than a sum of a size of the image data 31 and the estimated size of the intermediate data in Step S33, the data handling unit 22 identifies whether or not the size of the image data 31 is larger than the estimated size of the intermediate data (Step S36).

If the free area size of the network drive 4 is larger than a sum of a size of the image data 31 and the estimated size of the intermediate data in Step S34, the data handling unit 22 identifies whether or not the size of the image data 31 is larger than the estimated size of the intermediate data (Step S37).

If the size of the image data 31 is larger than the estimated size of the intermediate data in Step S36 or the size of the image data 31 is not larger than the estimated size of the intermediate data in Step S37, then the data handling unit 22 makes a copy of the image data 31 stored in the removable drive 2 and stores the copy in the HDD 17 (Step S38), sets the network drive 4 as a storing place of the intermediate data (Step S39), and causes the rendering unit 21 to perform a rendering process in the first rendering mode (Step S40).

Otherwise, if the size of the image data 31 is not larger than the estimated size of the intermediate data in Step S36 or the size of the image data 31 is larger than the estimated size of the intermediate data in Step S37, then the data handling unit 22 makes a copy of the image data 31 stored in the removable drive 2 and stores the copy in the network drive 4 (Step S41), sets the HDD 17 as a storing place of the intermediate data (Step S42), and causes the rendering unit 21 to perform a rendering process in the first rendering mode (Step S43). In this case, the rendering unit 21 reads the image data 31 from the network drive 4 and generates the bitmap image data from it.

In the aforementioned Embodiment 5, one of the HDD 17 and the network drive 4, which has a larger free area, is set as a storing place for one of the image data 31 and the intermediate data, which has the larger one of the size of the image data 31 and the estimated size of the intermediate data; and the other of the HDD 17 and the network drive 4, which has a smaller free area, is set as a storing place for the other of the image data 31 and the intermediate data, which has the smaller one of the size of the image data 31 and the estimated size of the intermediate data, and consequently, the possibility of the free area shortage is lowered.

Embodiment 6

In Embodiment 6, if a storing area is short for the intermediate data in a case the first rendering mode is selected, the data handling unit 22 identifies a size of all data stored in the removable drive 2. Subsequently, if a free area size of the HDD 17 is larger than the identified size of the all data stored in the removable drive 2, then the data handling unit 22 migrates the all data stored in the removable drive 2 to the HDD 17, deletes the all data stored in the removable drive 2, sets the removable drive 2 as a storing place for the intermediate data, and returns the migrated all data to the removable drive 2 after generating the bitmap image data.

Other parts in the configuration of the image processing apparatus 1 in Embodiment 6 are identical to those in Embodiment 1, and therefore, they are not explained here.

Figure 7:
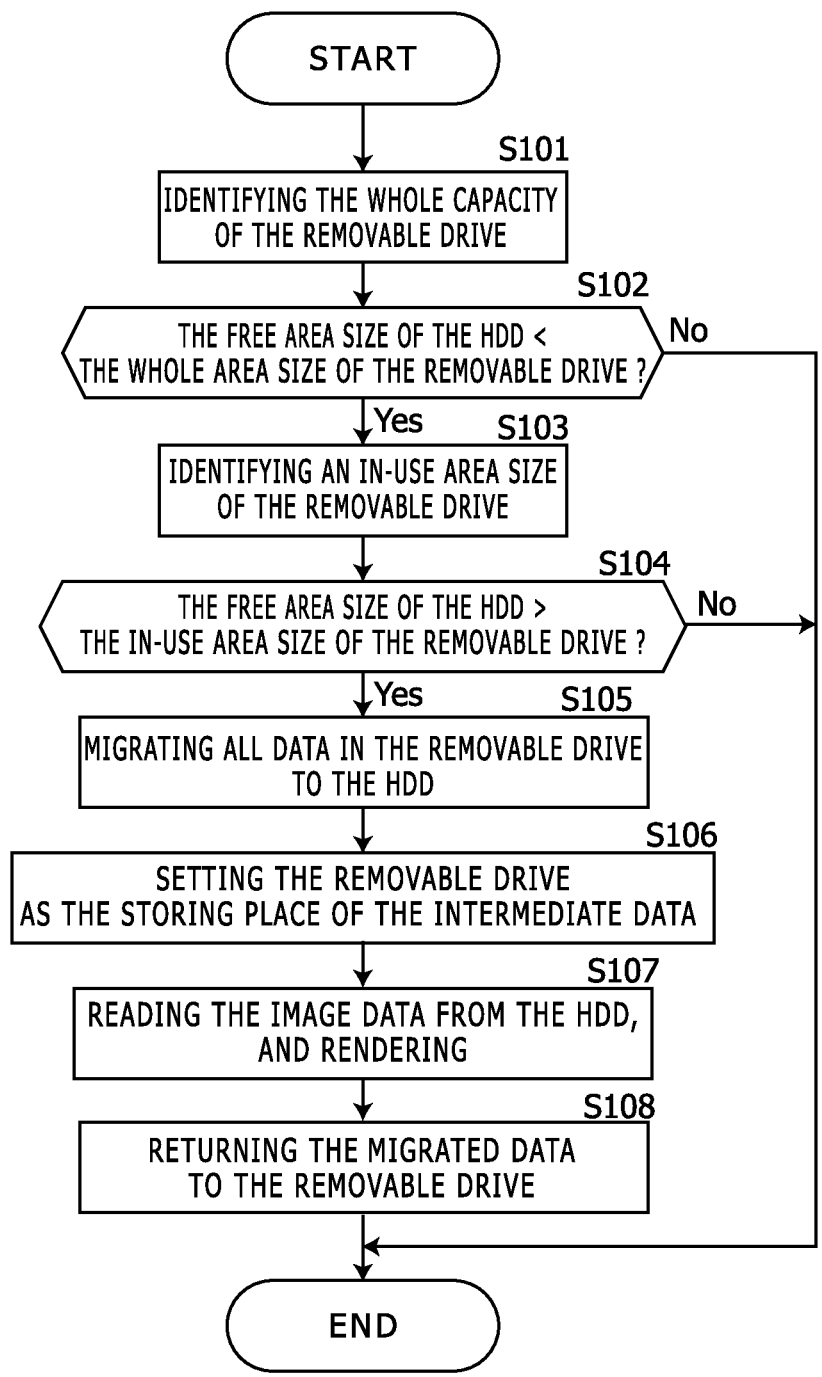
FIG. 7 shows a flowchart which explains a rendering process in Embodiment 6.

In Embodiment 6, if a writing area in the HDD 17 for the intermediate data is short while performing the rendering process shown in the aforementioned Embodiment 1 (FIG. 2), the following process is performed. FIG. 7 shows a flowchart which explains a rendering process in Embodiment 6.

In Embodiment 6, if a writing area for the intermediate data is short, then the data handling unit 22 identifies a whole area size of the removable drive 2 (Step S101), and identifies whether or not the whole area size of the removable drive 2 is larger than the free area size of the HDD 17 (i.e. the free area size identified in Step S3 in FIG. 2) (Step S102).

If the whole area size of the removable drive 2 is larger than the free area size of the HDD 17, then the data handling unit 22 identifies an in-use area size of the removable drive 2 (i.e. a size of all data stored in the removable drive 2) (Step S103), and identifies whether or not the free area size of the HDD 17 is larger than the in-use area size of the removable drive 2 (Step S104).

If the free area size of the HDD 17 is larger than the in-use area size of the removable drive 2, then the data handling unit 22 migrates all data stored in the removable drive 2 to the HDD 17 (Step S105). Specifically, a copy of all data stored in the removable drive 2 is made and stored in the HDD 17, and the all data stored in the removable drive 2 is deleted.

The data handling unit 22 sets the removable drive 2 as a storing place of the intermediate data (Step S106), and causes the rendering unit 21 to perform a rendering process in the first rendering mode (Step S107).

After finishing the rendering process, the data handling unit 22 returns the all data migrated to the HDD 17 to the removable drive 2 (Step S108).

In the aforementioned Embodiment 6, even if a writing area for the intermediate data is short while rendering, the removable drive 2 is used as the writing area for the intermediate data and the rendering process is performed again, and consequently printing is not cancelled.

The description has been presented for purposes of illustration and description, and is not intended to be exhaustive or limited to the present disclosure.

For example, in Embodiment 5, unshown another built-in HDD of the image processing apparatus 1 may be used instead of the network drive 4.

Further, in any of Embodiments 1 to 6, a non volatile memory drive such as SSD (Solid State Drive) or CF (Compact Flash) may be used instead of the HDD in the image processing apparatus 1.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
an interface configured to acquire image data from a removable drive;
a storage device;
a rendering unit configured (a) to generate intermediate data from the image data and store the intermediate data in the storage device, and (b) to generate bitmap image data on the basis of the intermediate data; and
a data handling unit configured (a) to estimate a size of the intermediate data on the basis of the image data, and (b) to select one of a first rendering mode and a second rendering mode on the basis of a size of the image data and the estimated size of the intermediate data;
wherein in the first rendering mode, the data handling unit is further configured to make a copy of the image data and store the copy in the storage device and to cause the rendering unit to generate the bitmap image data from the image data stored in the storage device; and
in the second rendering mode, the data handling unit is further configured to cause the rendering unit to generate the bitmap image data from the image data stored in the removable drive, to delete the image data stored in the storage device and cause the rendering unit to generate bitmap image data in the second rendering mode again if a storing area is short for the intermediate data in a case the first rendering mode is selected.

2. The image processing apparatus according to claim 1, wherein the data handling unit is further configured to select the first rendering mode if a free area size of the storage device is larger than a sum of the size of the image data and the estimated size of the intermediate data.

3. The image processing apparatus according to claim 1, wherein the data handling unit is further configured to select the first rendering mode if a sum of the size of the image data and the estimated size of the intermediate data is less than a predetermined threshold value.

4. The image processing apparatus according to claim 1, wherein the data handling unit is further configured to change a storing place of the intermediate data from the storage device to the removable drive if a storing area is short for the intermediate data in a case the first rendering mode is selected.

5. An image processing apparatus, comprising:
an interface configured to acquire image data from a removable drive;
a storage device;
a rendering unit configured (a) to generate intermediate data from the image data and store the intermediate data in the storage device, and (b) to generate bitmap image data on the basis of the intermediate data; and
a data handling unit configured (a) to estimate a size of the intermediate data on the basis of the image data, and (b) to select one of a first rendering mode and a second rendering mode on the basis of a size of the image data and the estimated size of the intermediate data;
wherein in the first rendering mode, the data handling unit is further configured to make a copy of the image data and store the copy in the storage device and to cause the rendering unit to generate the bitmap image data from the image data stored in the storage device; and
in the second rendering mode, the data handling unit is further configured to cause the rendering unit to generate the bitmap image data from the image data stored in the removable drive; wherein:
the data handling unit is further configured, in the first rendering mode, (c) to identify a free area size of the storage device and also identify a free area size of another second storage device than the storage device, and (d) to set one of the storage device and the second storage device, which has a larger free area, as a storing place for one of the image data and the intermediate data, which has the larger one of the size of the image data and the estimated size of the intermediate data, and set the other of the storage device and the second storage device, which has a smaller free area, as a storing place for the other of the image data and the intermediate data, which has the smaller one of the size of the image data and the estimated size of the intermediate data; and
the rendering unit is further configured to read the image data from one of the storage device and the second storage device and store the intermediate data in the other of the storage device and the second storage device.

6. An image processing apparatus, comprising:
an interface configured to acquire image data from a removable drive;
a storage device;
a rendering unit configured (a) to generate intermediate data from the image data and store the intermediate data in the storage device, and (b) to generate bitmap image data on the basis of the intermediate data; and
a data handling unit configured (a) to estimate a size of the intermediate data on the basis of the image data, and (b) to select one of a first rendering mode and a second rendering mode on the basis of a size of the image data and the estimated size of the intermediate data;
wherein in the first rendering mode, the data handling unit is further configured to make a copy of the image data and store the copy in the storage device and to cause the rendering unit to generate the bitmap image data from the image data stored in the storage device; and
in the second rendering mode, the data handling unit is further configured to cause the rendering unit to generate the bitmap image data from the image data stored in the removable drive; wherein the data handling unit is further configured (c) to identify a size of all data stored in the removable drive if a storing area is short for the intermediate data in a case the first rendering mode is selected and (d) to migrate the all data stored in the removable drive to the storage device, delete the all data stored in the removable drive, set the removable drive as a storing place for the intermediate data, and return the migrated all data to the removable drive after generating the bitmap image data if a free area size of the storage device is larger than the identified size of the all data stored in the removable drive.

* * * * *